United States Patent [19]

Schoening et al.

[11] Patent Number: 4,756,872
[45] Date of Patent: Jul. 12, 1988

[54] NUCLEAR POWER STATION FOR A GAS-COOLED HIGH TEMPERATURE PEBBLE BED REACTOR

[75] Inventors: Josef Schoening, Hambruechken; Winfried Wachholz, Gorxheimer Tal; Ulrich Weicht, Weinheim, all of Fed. Rep. of Germany

[73] Assignee: Hochtemperatur-Reaktorbau GmbH, Fed. Rep. of Germany

[21] Appl. No.: 655,418

[22] Filed: Sep. 28, 1984

[30] Foreign Application Priority Data

Sep. 29, 1983 [DE] Fed. Rep. of Germany ....... 3335268

[51] Int. Cl.$^4$ ...................... G21C 9/00; G21C 13/02; G21C 15/18
[52] U.S. Cl. .................................... 376/283; 376/293; 376/294; 376/295; 376/296; 376/298; 376/299
[58] Field of Search ............... 376/283, 293, 295, 298, 376/299, 381, 294, 296

[56] References Cited

U.S. PATENT DOCUMENTS

| | | | |
|---|---|---|---|
| 2,812,303 | 11/1957 | Daniels | 376/381 |
| 3,056,736 | 10/1962 | Went et al. | 376/283 |
| 3,125,760 | 3/1964 | Foster et al. | 376/293 |
| 3,320,969 | 5/1967 | Gordon | 376/293 |
| 3,372,092 | 3/1968 | Margen | 376/298 |
| 3,444,725 | 5/1969 | Chave | 376/293 |
| 3,556,941 | 1/1971 | Takahashi | 376/293 |
| 3,778,948 | 12/1973 | Berthier | 376/295 |
| 3,802,994 | 4/1974 | Förster et al. | 376/299 |
| 3,889,707 | 6/1975 | Fay et al. | 376/283 |
| 3,930,939 | 1/1976 | Bitterman et al. | 376/283 |
| 3,985,614 | 10/1976 | Jungman | 376/293 |
| 3,998,057 | 12/1976 | Haferkamp et al. | 376/293 |
| 4,343,681 | 8/1982 | Clermont et al. | 376/293 |
| 4,508,677 | 4/1985 | Craig et al. | 376/293 |

Primary Examiner—Deborah L. Kyle
Assistant Examiner—Richard W. Wendtland
Attorney, Agent, or Firm—Robert J. Koch

[57] ABSTRACT

The invention relates to a nuclear power station for a gas cooled high temperature pebble bed nuclear reactor. The nuclear power station is characterized by a combination of features, whereby the system inherent properties of a high temperature reactor are utilized to make possible the economical operation of a nuclear power station of medium capacity (300–600 MW$_{el}$) while maintaining a high standard of safety. The characteristics comprise a reactor protection building equipped with pressure relief means in combination with filters, several auxiliary cooling systems separate from the operating cooling systems for the removal of decay heat in the case of accidents, and the utilization of a liner cooling system for the prestressed concrete reactor pressure vessel to assure the removal of the decay heat in case of a failure of the auxiliary cooling systems.

6 Claims, 1 Drawing Sheet

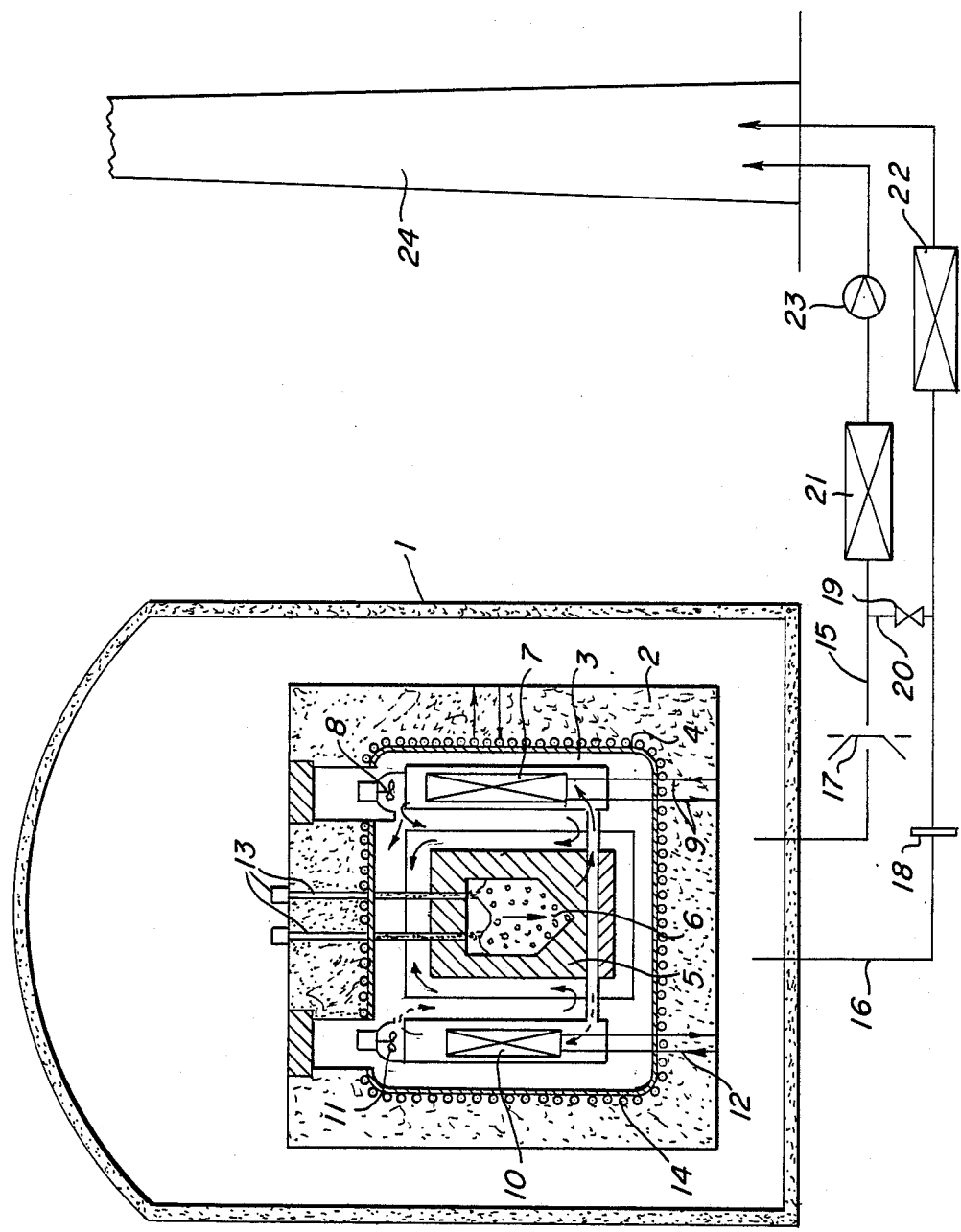

NUCLEAR POWER STATION FOR A GAS-COOLED HIGH TEMPERATURE PEBBLE BED REACTOR

BACKGROUND OF THE INVENTION

1. Field of the Invention:

The invention relates to a nuclear reactor housed in a prestressed concrete pressure vessel secure against bursting. The station includes a gas cooled high temperature reactor having primary loop components comprising steam generators and blowers in a large cavity clad with a liner of the prestressed concrete pressure vessel. A liner cooling system and at least one shutdown system are also included. A reactor core, the spherical fuel elements whereof comprise coated particles of a fissionable material embedded in a graphite matrix, is cooled by helium flowing from top to bottom through the reactor core as the cooling gas.

2. Background of the Art:

The THTR-300 MW$_{el}$ prototype nuclear power station is a nuclear power installation of the aforementioned high temperature, gas-cooled type. It comprises a high temperature reactor with sphehrical fuel elements utilizing helium as the cooling gas. Such reactor is often referred to as a pebble bed reactor which provides the environment of the present invention. A high temperature reactor of this configuration possesses a series of specific safety characteristics, whereby the risk of an accident in the course of the operation of such a power plant is reduced to a minimum. Even in the case of hypothetical incidents (accidents) the system's inherent safety characteristics of such high temperature reactors act to restrict environmental effects to relatively low values.

The characteristics of a high temperature reactor include the negative temperature and power coefficient under all operating conditions. The use of a gaseous and, thus phase stable coolant, specifically a neutron physically neutral inert gas is also characteristic whereby, even in the case of a pressure relief accident, the coolant cannot be lost entirely. A low ratio of power density/heat capacity is another characteristic. In the case of interference with the production or removal of heat, only slow changes occur in the temperature of the core. A further characteristic of high temperature reactors is the high temperature strength of the core material comprising ceramic material (graphite) and the fuel elements, wherein the fuel is embedded in the form of particles coated with pyrocarbon in a gas tight manner, so that fission products are retained in the graphite shell.

SUMMARY OF THE INVENTION

It is an object of the present invention to provide a nuclear power station of the aforedescribed structural type, which may be operated economically in a capacity range of 300–600 MW$_{el}$ and wherein simultaneously high safety standards may be maintained by utilizing the favorable accident behavior of the high temperature reactor.

This and other objects are attained by a nuclear power station for a gas-cooled high temperature pebble bed reactor having a pebble bed reactor core housed in a prestressed concrete pressure vessel 2, an operating cooling circuit comprising at least one steam generator 7 and blower 8, a secondary cooling circuit 9 and primary loop for flow of cooling medium through the reactor core from top to bottom and at least one reactor shutdown system 13. The nuclear power station according to the present invention comprises:

a reactor protection building surrounding the prestressed concrete pressure vessel and cooling circuits, means for relieving the pressure in the reactor protection building, means for filtering radioactive contaminants in the reactor protection building in combination with the pressure relief means, a plurality of auxiliary cooling circuits separate and independent from the operating and secondary cooling circuits and means for removal of decay heat of the reactor core in the event of failure of the auxiliary cooling circuits the means including a liner cooling circuit for the prestressed concrete pressure vessel.

The assurance of the retention of activities in case of incidents up to hypothetical accidents is to be considered the primary measure to reduce or eliminate risks in the operation of a nuclear power station. The retention of activities is determined essentially by the operating and accident temperatures and operating and accident pressures. The safety of a nuclear power station, therefore, depends primarily on the control of temperature and pressure problems; i.e. exceeding the failure temperature of the fuel elements and of the prestressed concrete pressure vessel must be sufficiently unlikely or excluded and the pressure integrity of the installation must be assured. In a nuclear power station according to the invention, the aforementioned temperature and power problems are safely under control.

BRIEF DESCRIPTION OF THE DRAWING

As shown in the figure, the reactor pressure vessel 2 of prestressed concrete secure against bursting with its internal liner 4, liner 1 cooling system 14 and insulation and containing the primary loop and its components, is surrounded by the reactor protection building 1, which collects the cooling gas leakage and conducts it through filters 21, 22 and a stack controlled into the environment. This is permissible in view of the slight cooling gas activity of high temperature reactors 5. For the same reason, it is not necessary to equip the reactor protection building with a liner, thereby appreciably reducing the cost of the installation. In the unlikely event of an extensive leakage of cooling gas from the reactor pressure vessel (for example in the case of the relief of the pressure of the reactor pressure vessel through a safety valve following a massive incident involving the primary cooling loop), the pressure relief devices 17, 18, 19, 20, and 23 combined with filters of the reactor protection building are actuated. It is, therefore, not necessary to design the reactor protection building for full pressure. The cross section of the stack is such that in the case of maximum outflow values the design pressure based on the static design dimensions of the reactor protection building 1 is not exceeded. Static design dimensions are such that the protection building would remain intact even in emergency situations such as the crash of an aircraft into the reactor protection building 1. All the components of importance from the standpoint of safety technology are thereby protected against external effects. Optionally, larger access locations (personnel and material doors) may be protected by outbuildings in front of them, while they themselves remain unprotected.

As mentioned above, the temperature plays an essential role, in addition to pressure, in the assurance of the safe retention of activities in the case of accidents. Temperature increases in the core normally result from a disproportionality between the production and removal of heat. Decay heat is removed in normal operation by means of the operational cooling systems 7, 8, 9, i.e. the steam generators 7 of the principal loops and the secondary loop 9. In case of a failure of the operating cooling systems or of external effects leading to increased temperature loads on the cooling systems, the removal of the decay heat is effected according to the invention by auxiliary cooling systems 10, 11, 12, which are separate from the operating cooling systems; i.e. the operating and safety systems are not interconnected. Even in the case of incidents resulting in a loss of cooling gas and reducing the pressure in the core to the environmental pressure, the existing cooling gas density is still adequate to remove the decay heat safely by means of the auxiliary cooling systems.

During normal operation of gas-cooled high temperature pebble bed reactors, only slow temperature changes take place. Thus, a relatively long period of time is available for the actuation of the countermeasures required to control any accidents, i.e. the shutdown system 13 of the reactor and the activation of the auxiliary cooling systems. This sluggish temperature-time behavior of the high temperature reactor renders it possible to further introduce measures to re-establish the removal of decay heat in case of a failure of the auxiliary cooling systems. These measures may include manual operations.

Should the failure of the auxiliary cooling systems extend over a longer period of time (several hours), the decay heat is removed by the liner cooling system 14. No additional loads are thereby placed on the system, as its availability in view of its capacity as a vessel cooling system is adequately high. In the case of the removal of heat by means of the liner cooling system 14 alone, the maximum temperature of the fuel elements rises within a few hours (to approx. 1500° C.). This temperature, however, does not damage the fuel elements.

Advantageously, the pressure relief means of the reactor protective building may be connected with relief paths, 15, 16 which are automatically opened when a certain pressure is exceeded and closed when the pressure drops below the actuating pressure. This measure provides the assurance that the retention of activity by the reactor protection building is maintained even over extensive periods of time.

For the removal of decay heat in case of a failure of the operating cooling systems (for a high temperature reactor within a capacity range of 300–600 MW$_{el}$) two separate auxiliary cooling systems are appropriately provided. One system is adequate to remove the decay heat, without exceeding the design limits of the components for incidents involving no loss of coolant.

If following a rapid relief of pressure and only one auxiliary cooling system is available, the decay heat is removed by the utilization of design reserves.

Should both auxiliary cooling systems fail, the liner cooling system 14 is used to remove the decay heat. In case of an event without loss of coolant, natural convection is generated in the primary loop by the buoyancy effect, the convection opposing the normal direction of flow. This flow removes the heat from the core and transfers it to the liner cooling system 14.

In the case of a pressure relief accident in a gas cooled reactor the decay heat may again be transferred to the liner cooling system 14. However, the larger portion of the heat to be removed is initially stored in the core 6 and transferred by radiation and conduction to the liner cooling system. This results in a slow rise in temperature in the core 6; but as damage to the fuel elements occurs only after the normal operating temperature has been exceeded considerably, there is sufficient time to reactivate by suitable counter measures the auxiliary cooling systems. These counter measures initially include automatically actuated actions on the basis of automatic detection. Subsequently, manual measures can be performed by operating personnel from the control room, after a realistic evaluation of the accident and the state of the installation has been established. Finally, emergency measures may be effected by the operators to repair or replace failed parts of the plant.

What is claimed is:

1. A nuclear power station for a gas-cooled high temperature pebble bed reactor comprising:
   a prestressed concrete pressure vessel with a pressure containment liner housing a pebble bed reactor,
   an operating cooling circuit comprising at least one steam generator and blower, a secondary cooling circuit, cooling medium flow through said reactor core from top to bottom within said pressure vessel,
   at least one reactor shutdown system;
   a linerless reactor protection building surrounding said prestressed concrete vessel and said cooling circuits,
   means for relieving pressure in said reactor protection building,
   means for filtering radioactive contaminants in said reactor protection building in combination with said means for relieving pressure,
   a plurality of auxiliary cooling circuits separate and independent from said operating and secondary cooling circuits, and
   means for removal of decay heat of said reactor core in the event of failure of said auxiliary cooling circuits, said means including a prestressed concrete pressure vessel liner cooling circuit.

2. The nuclear power station of claim 1, wherein said means for relieving pressure comprise temperature and pressure control devices.

3. The nuclear power station of claim 1, wherein said means for relieving the pressure of said reactor protection building are connected with relief paths, which open automatically when a certain pressure is exceeded and close when the pressure drops below the actuating pressure.

4. The nuclear power station of claim 1, wherein two separate auxiliary cooling systems are provided, one of said auxiliary cooling systems being sufficient for the removal of the decay heat in the event of accidents without the loss of coolant.

5. The nuclear power station of claim 1, wherein said means for removal of decay heat is the natural convection of said decay heat into the liner cooling circuit.

6. The nuclear power station of claim 1, wherein said means for removal of decay heat is by radiation and conduction into the liner cooling circuit.

* * * * *